United States Patent [19]
Eaton et al.

[11] 3,979,729
[45] Sept. 7, 1976

[54] MICROPROGRAM UNIT FOR A DATA PROCESSOR

[76] Inventors: John Richard Eaton, 14, Sandown Road, Haslingden, Lancashire; Derek William Ashcroft, 10, Sandown Drive, Sale, Cheshire, both of England

[22] Filed: July 12, 1974

[21] Appl. No.: 488,091

[30] Foreign Application Priority Data
July 18, 1973 United Kingdom............... 34216/73

[52] U.S. Cl. ............................................. 340/172.5
[51] Int. Cl.² ........................................... G06F 9/16
[58] Field of Search ................................. 340/172.5

[56] References Cited
UNITED STATES PATENTS

| | | |
|---|---|---|
| 3,391,394 | 7/1968 | Ottaway et al.................. 340/172.5 |
| 3,766,532 | 10/1973 | Liebel, Jr......................... 340/172.5 |
| 3,781,823 | 12/1973 | Senese ............................ 340/172.5 |
| 3,839,705 | 10/1974 | Davis et al...................... 340/172.5 |
| 3,930,236 | 12/1975 | Ferguson et al. ................ 340/172.5 |

*Primary Examiner*—Gareth D. Shaw
*Assistant Examiner*—C. T. Bartz

[57] ABSTRACT

In a microprogram unit, an index store is provided to translate index addresses, derived from input instructions, into start addresses for microprogram routines. Thus, if microprogram routines have to be re-ordered within the microprogram store, it is only necessary to modify the contents of the index store, and further modifications to the microprogram unit, or to the input instructions, are not necessary. Start addresses may be derived in an overlapped manner, so as to increase processing speed.

3 Claims, 3 Drawing Figures

| | F | F K | D T | D Z | F | D Z |
|---|---|---|---|---|---|---|
| n | LOAD 14<br>DECODE F | | | | | |
| n+1 | 34→40<br>40→61 | LOAD 13<br>DECODE FK | | | | |
| n+2 | | 45→40<br>40→60 | DECODE DT | | | |
| n+3 | | | 48→40<br>40→61 | DECODE DZ | | |
| n+4 | | | | 51→40<br>40→61 | DECODE F | |
| n+5 | | | | | 34→40<br>40→61 | DECODE DZ |
| n+6 | | | | | | 51→40<br>40→61 |

MICROPROGRAM UNIT FOR A DATA PROCESSOR

BACKGROUND OF THE INVENTION

The invention relates to a microprogram unit for a data processor.

Microprogram units for data processors operate relative to a microprogram store to access routines of basic micro-instructions in order to implement various instructions within the processor. The extracted micron-instructions control the states of the various units of the processor in order to execute each desired instruction. Often, the microprogram store is writable and this allows the total microprogram to be larger than the immediate microprogram store capacity so long as an appropriate overlay facility is provided for inserting microprogram material into the immediate store as required. A suitable overlay technique is disclosed in copending U.S. Pat. Application Ser. No. 488,907, now U.S. Pat. No. 3,924,245.

The fact that the microprogram store is writable also means that the microprogram material itself is easily altered. This is particularly useful both at an early design stage of a processor and later as most computer systems are continuously developed throughout their life. However, the microprogram is most conveniently arranged sequentially relative to store addresses so that the normal accessing procedure (i.e. except for jumps between routines or specific micro-instructions) is to increment the accessing address by unity between cycles. Then, any alteration to the microprogram material that results in addition or removal of micro-instructions, or reordering of the totality of micro-instruction routines will give rise to a need for renumbering the start addresses of the routines. Usually, this involves extensive alterations in the microprogram unit.

SUMMARY OF THE INVENTION

According to the invention, there is provided a microprogram unit for a data processor, comprising: a microprogram store containing a plurality of microprogram routines, each routine comprising one or more micro-instructions at sequential addresses in the microprogram store; a writable index store for holding a table of start addresses of the microprogram routines in the microprogram store; and means for deriving an index address from an input instruction and for applying the index address to the index store, to obtain the start address of a microprogram routine for executing the input instruction.

It will be seen that the index store serves to translate the index addresses derived from the input instructions into start addresses for the microprogram store. Thus, any modification of the start addresses of the microprogram routines only requires a modification of the table in the index store, and does not affect the rest of the microprogram unit.

One advantage of such a microprogram unit is that the word length of the contents of the index store may be greater than that required to address the microprogram store, with the balance used as an extension of the micro-instruction at the specified address. Such an extension may relate to the setting of flags, conditions or indicators to be used in the execution of the processor order by the microprogram routine concerned. Alternatively, it could be used as a scratch pad address.

In one particular unit in accordance with the invention, index addresses may also be derived from a descriptor register containing information about an indirect operand. Another source of index addresses may be an interrupt unit.

Preferably, derivation of an index address for application to the index store proceeds concurrently with application of a previously derived address to the index store. This provides a degree of overlapped operation in the microprogram unit which at least partially offsets any time delay involved in accessing the index store. These operations for deriving start addresses may, in turn, proceed concurrently with the execution of micro-instructions from the microprogram store, thus providing a further degree of overlap.

BRIEF DESCRIPTION OF THE DRAWINGS

One microprogram unit in accordance with the invention will now be described, by way of example, with reference to the accompanying drawings of which.

DESCRIPTION OF THE PREFERRED EMBODIMENT

The particular embodiment of the invention to be described is a microprogram unit for controlling the operation of a computer apparatus having a logic and arithmetic unit and a main store. The microprogram unit is designed to receive a stream of instructions, fetched from the main store by a suitable instruction fetching unit, and to translate each such instruction into a number of microprogram routines (each consisting of a succession of micro-instructions) for controlling the necessary data transfers and operations within the computer for execution of the instruction.

Figures 1, 3:
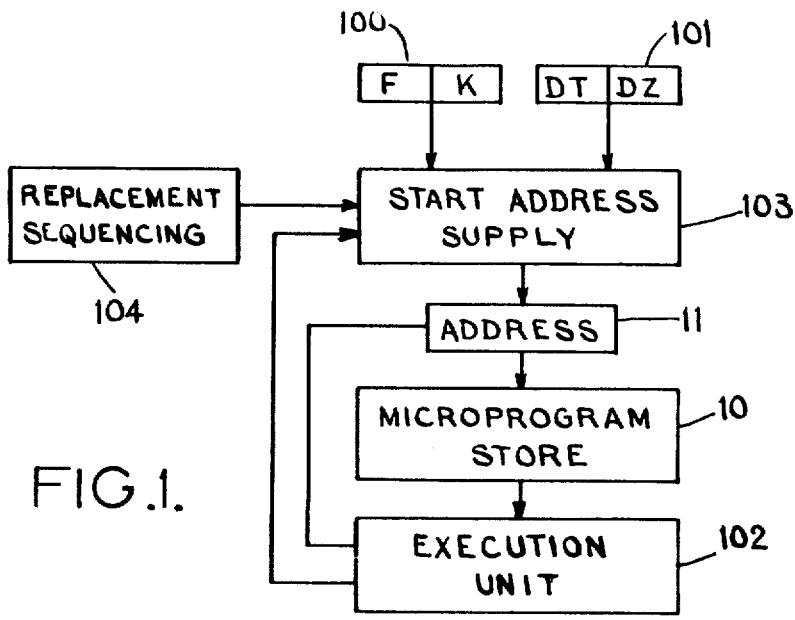
FIG. 1 is a schematic block circuit diagram of the microprogram unit.
FIG. 3 is a sequencing chart summarising the sequence of operation of the start address supply unit.

Referring to FIG. 1, input instructions for the microprogram unit appear in an instruction buffer 100. Each instruction comprises two parts:

i. A function part F which specifies a particular logic or arithmetic function to be performed. The function may be a read function, involving reading an operand and then performing the specified function on it, or may be a write function, involving performing the specified function and then writing the result into an operand location so as to update the value of that operand.

ii. An operand part K which contains information relating to the operand on which the function is to be performed or which is to be updated by the result of the function. The operand may be specified directly or indirectly.

For a direct operand, the main store address of the operand is calculated directly from the K part of the instruction. For an indirect operand, however, the K part provides the address of a descriptor which points to the operand. Thus, in order to execute an instruction involving an indirect operand, a main store access must first be made to obtain the descriptor and then a further access made to obtain the operand itself.

Instructions can therefore be classified into four types: direct read, direct write, indirect read, and indirect write.

When a descriptor is accessed, it is placed in a special descriptor register 101. Each descriptor comprises two parts:

i. A data type part DT which contains information necessary for calculating the main store address of the required operand.
ii. A data size part DZ which contains information regarding the size of the operand (e.g. 32 bit, 64 bit or 128 bit).

The microprogram unit includes a microprogram store 10 in which the necessary microprogram routines are held, and which is addressed by means of an address register 11. Each micro-instruction read out of the store 10 is applied to an execution unit 102 which generates corresponding control signals for application to the various parts of the computer apparatus. The address register 11 is normally incremented by unity by the execution unit 102 after execution of each micro-instruction, although some micro-instructions may specify jumps (either conditional or unconditional) which will result in a departure from this normal sequence.

When a microprogram routine has been completed a new routine is initiated by the execution unit, by applying a "branch" signal to a start address supply unit 103, which responds by loading a new start address into the address register 11 so as to produce a branch to the start of the new routine. This start address is derived, as will be described, either from the F and K parts of the instruction, from the F part alone, or from the DT or DZ part of the descriptor. Branches are therefore referred to as FK, F, DT or DZ branches according to the source of the start address.

Each different type of instruction requires a different sequence of microprogram routines: direct read and write instructions each involve two routines initiated respectively by FK and F type branches, indirect read instructions involve five routines initiated respectively by FK, F, DT, DZ and F type branches; and indirect write instructions involve six routines, initiated respectively by FK, F, DT, DZ, F and DZ type branches.

Details of the microprogram routines form no part of the present invention, and are not essential to an understanding of the present description, and so will not be described further in this specification.

It will be seen that branches always occur in a predetermined fixed sequence: FK, F, DT, DZ, F and DZ, although the whole of this sequence is only required for indirect write instructions. As will be shown, this fixed sequence permits the start address for each branch to be derived in advance, concurrently with the execution of the preceding microprogram routine, so that the new start address can be ready for application to the address register 11 when it is called upon by a "branch" signal. This results in a minimum of delay between the end of one microprogram routine and the initiation of the next.

Derivation of the start addresses by the supply unit 103 is controlled by a replacement sequencing unit 104, which generates a sequence of control signals n, n + 1, —n + 6, for application to the supply unit 103. The manner in which these signals act on the unit 103 will be described after a description of the unit 103 itself.

Figure 2:
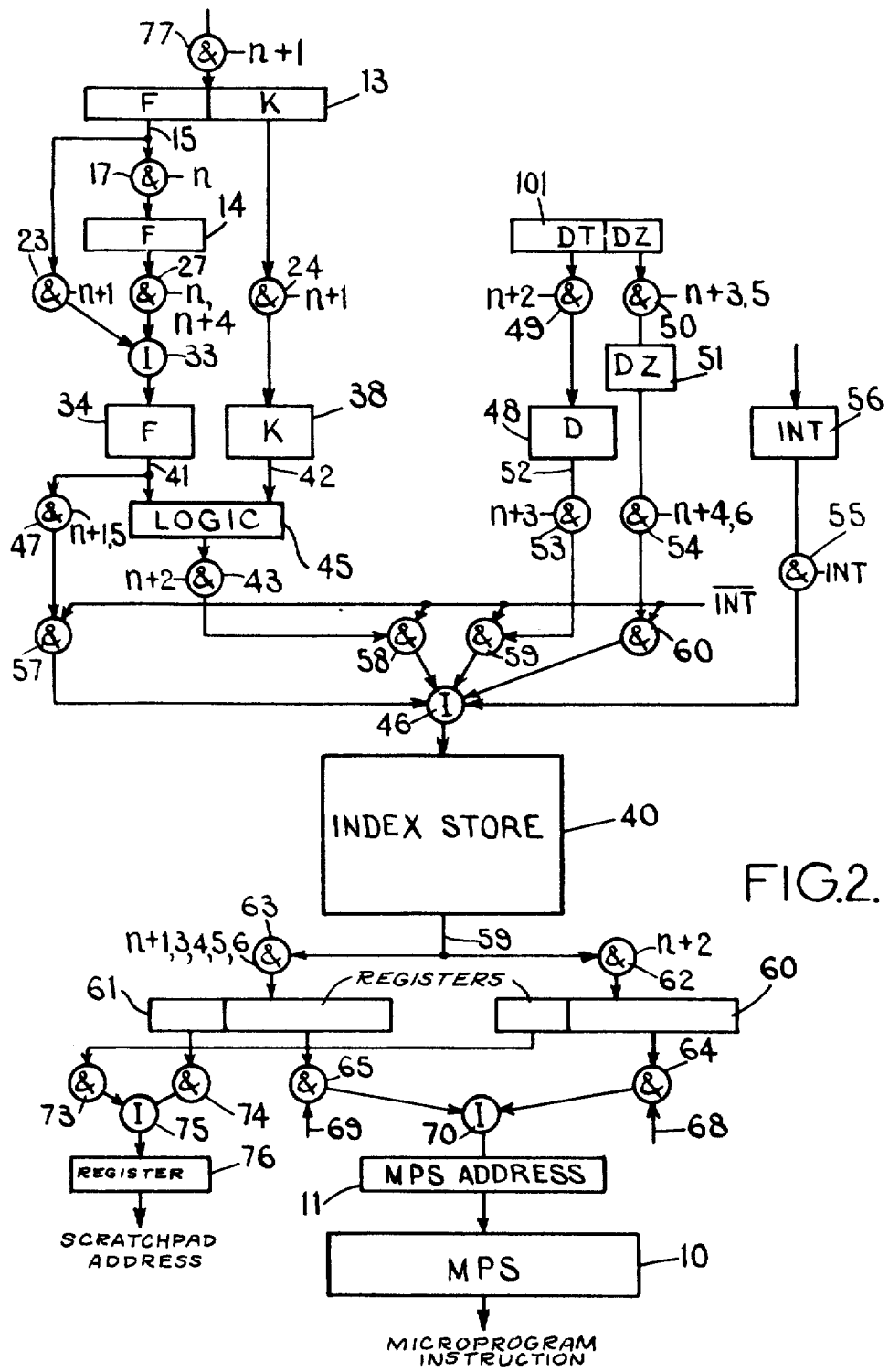
FIG. 2 is a detailed diagram of a start address supply unit forming part of the microprogram unit.

Referring now to FIG. 2, this shows the start address supply unit 103 of FIG. 1 in detail.

The supply unit 103 includes a writable index store 40, typically having a capacity of 256 seventeen-bit words. This store holds a table of microprogram start addresses (up to 256 such addresses). The store 40 is addressed by an eight-bit index address from an OR gate 46, and serves to translate each such index address into a corresponding start address on output path 59. The start address is stored in one of two seventeen-bit registers 60 and 61 according to which of two AND gates 62 and 63 is enabled. In the present embodiment, microprogram addresses are in fact, only 10 bits long, so that only the ten least significant bits of each register 60, 61 are required for the start address. The remaining seven bits serve various purposes: they can be used effectively as extensions to one or more fields of a micro-instruction, or to set flags or indicators, or to provide a local scratchpad store address.

The index address for addressing the store 40 is normally (i.e. in non-interrupt conditions) derived from one of four sources, according to the type of branch:

i. For an FK type branch, the start address is derived from a next instruction register 13 which holds both the F and K parts of the next instruction to be executed and which is loaded from the instruction buffer 100 (FIG. 1) via an AND gate 77. The contents of the F part of the register 13 are applied by way of an AND gate 23 and an OR gate 33 to a decoder 34. The contents of the K part are similarly applied by way of an AND gate 24 to another decoder 38. The outputs 41, 42 of the decoders 34, 38 are combined in a logic circuit 45 to produce the required index address which is applied to the index store 40 via AND gates 43 and 58 and the OR gate 46. The output from the index store 40, on path 59, in this case contains the start address of the first microprogram routine for the next instruction, and is stored in the output register 60, which is specially reserved for this purpose, so that it is ready for immediate use as soon as the execution of the current instruction has been completed.

ii. For an F type branch, the start address is derived from a current instruction register 14 which holds only the F-part of the instruction currently being executed, and which is loaded from the next instruction register via an AND gate 17. The contents of this register 14 are applied via an AND gate 27 to the OR gate 33 and hence to the decoder 34. The output of the decoder 34 in this case constitutes the required index address and is applied to the index store 40 via AND gates 47 and 57, and the OR gate 46. The output from the index store is in this case stored in the register 61, which is used for holding start addresses of microprogram routines other than the first routine for an instruction.

iii. For a DT type branch, the start address is derived from the DT part of the descriptor register 101. The DT is applied via an AND gate 49 to a decoder 48 which produces the required index address. The index address is applied to the index store 40 via AND gate 53 and 59 and the OR gate 46. The output of the index store is in this case applied to the output register 61.

iv. For a DZ type branch, the start address is derived from the DZ part of the descriptor register 101. The DZ part is applied via an AND gate 50 to a decoder 51 which produces the required index address. The index address is applied to the index store 40 via AND gates 54 and 60 and OR gate 46. The output of the index store is again applied to the register 61.

Conveniently, the four decoders 34, 38, 48 and 51 may be provided by random access memory units. This makes the system more flexible, since it means that any of the decoding operations may be altered merely by writing new information into the appropriate random access memory.

In addition to these four normal sources, an index address can also be derived from an interrupt input 56, via an AND gate 55 which is enabled by an interrupt signal INT. The inverse of the interrupt signal is applied to the four AND gates 57–60, so that these gates are normally enabled in non-interrupt conditions, but are disabled when an interrupt occurs, so as to prevent any of the four normal sources from applying index addresses to the index store 40 in the interrupt condition.

The start address supply unit 103 receives two kinds of "branch" signal from the execution unit 102 (FIG. 1). The first, on path 68 (FIG. 2), signifies that execution of an instruction has been completed and that an FK branch is required for the start of the first microprogram routine of the next instruction. This signal is therefore applied to an AND gate 64 which causes the start address contained in register 60 to be applied via an OR gate 70, to the microprogram store address register 11. The other kind of "branch" signal, on path 69, signifies that the execution of a microprogram routine has been completed, and that an F, DT, or DZ branch is required for the start of the next routine of the current instruction. This signal is therefore applied to an AND gate 65 which causes the start address contained in register 61 to be applied to the address register 11 via the OR gate 70. The branch signals also control AND gates 73 and 74 so as to cause the remaining bits in the register 60 or 61 to be applied, via an OR gate 75, to a flag register or scratchpad address register 76.

As shown in FIG. 2, the various AND gates 77, 17, 23, 24, 27, 47, 49, 50, 53, 54, 62 and 63 are enabled by the sequence of control signals n, n + 1, etc. produced by the replacement sequencing circuit 104 (FIG. 1). These signals are produced in sequence, in synchronism with the execution cycle of micro-instructions by the execution unit 103, and control the replacement of the contents of the registers 60, 61 (FIG. 2) whenever the contents of one of these two registers is loaded into the address register 11.

The effect of these control signals is conveniently summarised in FIG. 3, in which the effect of successive signals, n, n+1, etc. is shown in successive horizontal rows, reading from top to bottom. Within each row, the upper operations are performed earlier in the cycle than the lower operations. For example, in row n + 1, the first column indicates that the output of decoder 34 is applied to the index store 40 (by enabling AND gate 47) early in the cycle, and that the output of the index store 40 is then applied to the register 61 (by enabling AND gate 63) relatively late in the cycle. This ensures that the output of the index store 40 has time to settle down to a stable value before it is applied to the register 61. Similarly, the second column in row n + 1 indicates that the register 13 is loaded (by enabling AND gate 77) early in the cycle, and that the contents of this register are applied to the F and K decoders 34, 38 (via AND gates 23, 24) relatively late in the cycle. This ensures that the new values of F and K have time to settle down to stable values in the register 13 before they are decoded.

Whenever the contents of the register 60 are loaded into the address register 11 to initiate a new instruction, the first three control signals n, n + 1 and n + 2 are produced in sequence. It will be seen from FIG. 3 that this results, at signal n + 2, in replacement of the contents of register 60 with a new FK branch address for the next instruction. This address will therefore be immediately available when execution of the current instruction is completed. In addition, the contents of register 61 are replaced at signal n + 1 with an F branch address for the current instruction.

One further control signal n + 3, n + 4 etc. in the sequence is produced each time a further branch is performed using the contents of the register 61, until the execution of the current instruction is completed, whereupon the sequence is restarted at signal n for the next instruction. Signal n + 3 causes the contents of the register 61 to be replaced by a DT branch address, n + 4 by a DZ branch address, n + 5 by another F branch address, and finally n + 6 by another DZ branch address.

Thus, it will be seen that the replacement sequencing circuit ensures that branch addresses for F, DT and DZ type branches are always available in the correct sequence in register 61 for performing any of the sequences of microprogram routines. Moreover, it also ensures that the branch address for the initial FK branch of the next instruction is available when required.

In FIG. 3, sequences of operations concerned with deriving different branch addresses have been grouped into separate columns for clarity.

For example, the first column shows the sequence for deriving the F branch start address, while the second column shows the sequence for deriving the FK branch start address for the next instruction. It can be seen from this that the various sequences for deriving different start addresses are overlapped, thus reducing the effective time taken to derive these start addresses.

We claim:

1. A microprogram unit for a data processor, comprising:
   a. an instruction register for receiving an input instruction;
   b. a first writable random access store containing a plurality of values;
   c. means for applying the instruction in said instruction register to said first store to address the first store to read out one of said values therefrom;
   d. a second writable random access store containing a plurality of microprogram start addresses;
   e. means for applying said value read from the first store and which value represents an address in said second store to said second store to address the second store to read out one of said microprogram start addresses therefrom;
   f. a microprogram address register;
   g. means for writing said microprogram start address read from said second store into said microprogram address register;
   h. a third writable random access store containing a plurality of microprogram instructions; and
   i. means for applying the microprogram start address in said microprogram address register to said third store to address the third store to read out one of said microprogram instructions therefrom.

2. A microprogram unit for a data processor comprising:
   a. An instruction register for receiving an input instruction;
   b. a first writable random access store containing a plurality of values;
   c. means for applying the instruction in said instruction register to said first store to address the first store to read out a first and a second value therefrom;
d. a second writable random access store containing a plurality of microprogram start addresses;
e. means for applying said first and second values read from the first store, which values represent first and second addresses respectively in said second store, to said second store to address the second store to read out first and second microprogram start addresses therefrom;
f. first and second buffer registers;
g. first gating means operative to write the first microprogram start address read from the second store into the first buffer register and to write the second microprogram start address read from the second store into the second buffer register;
h. a microprogram address register;
i. second gating means operative during a first part of an operating sequence to write the first microprogram start address from the first buffer register into the microprogram address register and operative during a second part of the operating sequence to write the second microprogram start address from the second buffer register into the microprogram address register;
j. a third writable random access store containing a plurality of microprogram instructions; and
k. means for applying the first and second microprogram start addresses in said microprogram address register to said third store to address the third store to read out first and second microprogram instructions therefrom;

3. A microprogram unit for a data processor, comprising;

a. an instruction register for receiving an input instruction;
b. a first writable random access store containing a plurality of first values;
c. means for applying the instruction in said instruction register to said first store to address the first store to read out one of said first values therefrom;
d. a descriptor register for receiving input control information;
e. a second writable random access store containing a plurality of second values;
f. means for applying the control information in said descriptor register to said second store to address the second store to read out one of said second values therefrom;
g. a third writable random access store containing a plurality of microprogram start addresses;
h. gating means operative to apply in sequence the first value read from the first store and the second value read from the second store, said first and second values representing first and second addresses respectively in the third store, to the third store to address the third store to read out first and second microprogram start addresses therefrom;
i. a microprogram address register;
j. means for writing said first and second microprogram start addresses read from the third store into said microprogram address register;
k. A forth writable random access store containing a plurality of microprogram instructions; and
l. means for applying the first and second microprogram start addresses in said microprogram address register to said forth store to address the fourth store to read out microprogram instructions therefrom.

* * * * *